Jan. 5, 1960 J. A. WHITE 2,920,293

PULSE FORMING NETWORK ASSEMBLY

Filed April 23, 1954

INVENTOR.

JAMES A. WHITE

BY

Connolly and Hutz

HIS ATTORNEYS

United States Patent Office 2,920,293

Patented Jan. 5, 1960

2,920,293

PULSE FORMING NETWORK ASSEMBLY

James A. White, Williamstown, Mass., assignor to Sprague Electric Company, North Adams, Mass., a corporation of Massachusetts Application April 23, 1954, Serial No. 425,207

2 Claims. (Cl. 333—29)

Figures 1, 2, 3:
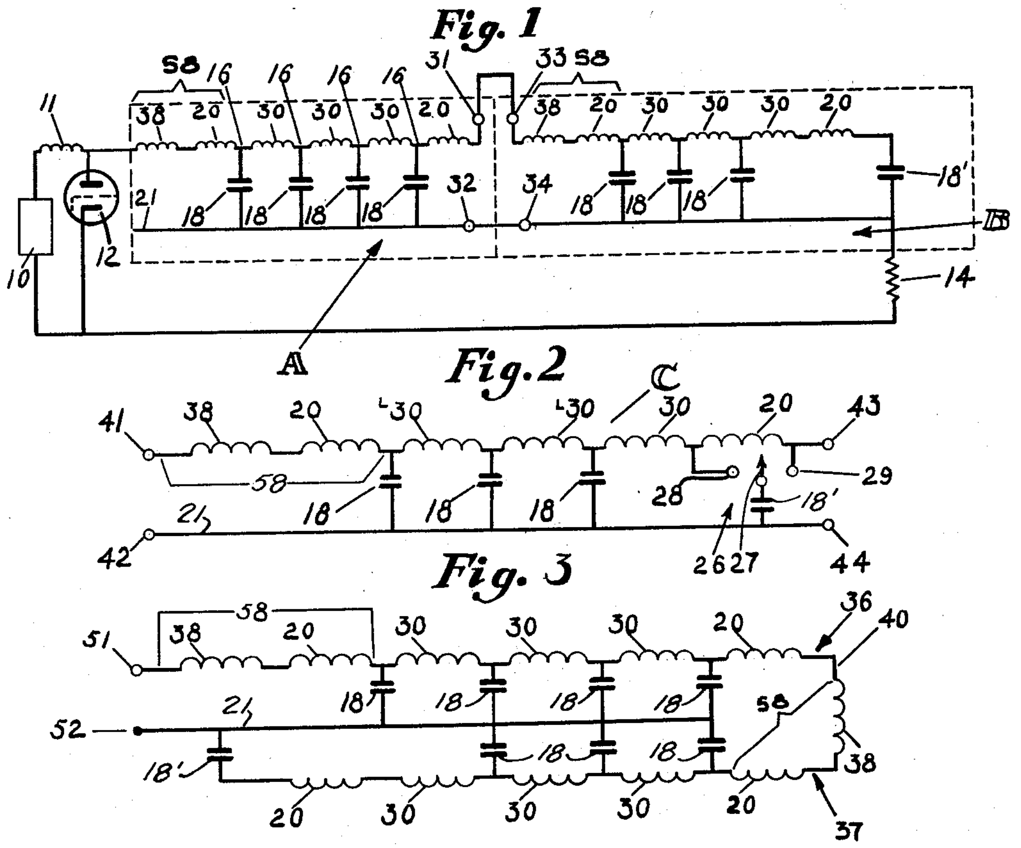

This invention relates to an improvement in pulse forming networks and more particularly to network systems capable of yielding pulses of various lengths without distortion of the pulse wave form.

One of the basic contributions to pulse forming networks was by E. A. Guillemin and forms the subject matter of his United States Patent No. 2,461,321. Within the specification of the Guillemin patent, which covers numerous types of pulse forming networks using capacitors and inductors and various configurations, there is one type which has become known as Type E and is represented by Figures 16, 20 and 21 of the patent. Also in the M.I.T. series of Radiation Texts, volume 5 entitled "Pulse Generators" (published 1948 by McGraw-Hill) on pages 200 to 207, various pulse forming networks are considered including the Type E as indicated on page 205.

In the operation of apparatus requiring the use of a pulse forming network it is often times necessary to utilize pulses of various lengths, for example, various pulse lengths being required for each phase of the operation of an apparatus. In the utilization of networks to yield various pulse lengths two alternatives are possible, either to have separate networks for each pulse length or to use one pulse forming network which can be switched so as to achieve the desired length. The latter method has been well accepted although it suffers from the severe disadvantage of pulse forming distortion resulting in inferior operational characteristics of electronic devices used.

In the Guillemin patent the Type E section has been shown to be modified to achieve better pulse shape by adjusting the number of turns in the end sections of the inductor so as to achieve minimum pulse distortion. This method results in an improved form of a pulse shape for a single unit. However, when units are series connected so as to obtain longer pulse lengths, the present procedure of connecting these networks directly in series causes these adjusted networks to unduly distort the formed pulses with a characteristic oscillation for each individual network section connected in series. Switching also becomes difficult if the end section adjustment is to be preserved in all switching positions.

The other alternative of using separate networks is complicated by excessive inductance resulting from the necessary external lead connections. Even with these disadvantages the latter arrangement is presently used where packaging of the electronic gear does not make possible a unitary assembly.

It is an object of this invention to overcome the foregoing and related disadvantages. It is a further object of this invention to provide new and useful electrical circuits capable of producing pulses of various lengths from a single or multiple assembly without distortion of the wave form. It is a still further object to produce electrical circuits capable of generating and impressing a plurality of substantially square energy pulses across a load. A still further object is to produce improved electrical networks of the lumped constant variety for use in the above and related electrical circuits. A still further object is to produce a network which is semi-universal in nature, namely that it can be connected in series with a plurality of others or as a terminating section in a network without deformation of the pulse of energy arising from said network. Additional objects will become apparent from the following description and appended claims.

These objects are attained in accordance with the present invention wherein there is produced an electrical circuit comprising a source of power, an isolation impedance reactor, an electrical network capable of generating substantially square pulses of various lengths, and a load; said electrical network and said load forming a circuit during the discharge interval. In a more restricted sense this invention is concerned with an electrical pulse forming network of the E type modified with an added series inductance at its terminal end to improve the form of the generated pulses. This invention also includes a modified E type pulse forming network having a switchable capacitor selectably connectable to either end of an inductor at a point substantially in the center of the terminal inductor section. A further feature of this invention is the miniaturization of pulse forming networks by having separated inductors arranged side-by-side around a zone in which the parallel capacitors are positioned.

For more complete understanding of the scope of my invention, reference should now be made to the drawings in which Fig. 1 pictures an operational circuit using a plurality of series-connected individual sections;

Fig. 2 illustrates a single section of a universal type network which can be used either as the intermediate series connected sections or the terminating section; and Fig. 3 shows a multi network section of miniaturized form.

It has been found that the addition of a supplemental terminating inductance to a pulse-forming network greatly improves the pulse shaping, apparently because it adds inductance to make up for missing mutual inductance in the terminal portion of the pulse forming network. It has also been discovered that a standard network unit can be used for either the beginning, middle or terminating sections in a multi section network. A simple switching arrangement of the terminal capacitor makes possible a substantially distortionless pulse in multi section network.

Reference should now be made to Fig. 1 in which 10 refers to a source of power such as a D.C. generator, battery, A.C. rectifying units, etc. An inductive reactor 11 for D.C. applications, merely inserts a high impedance to the flow of high frequency currents and low impedance to low frequency currents, for example, 60-cycle current. A suitable diode may be employed in series with or in place of the reactor 11 to prevent reverse current flow. A thyratron tube 12 serves as a switch for the discharge of the network. Connected to the plate of the thyratron tube is the pulse forming network which is indicated by the symbols A and B. The dotted lines dividing the network in two parts represent the containers in which the said network portions are confined. Portion A is a nonterminating network and portion B is a terminating network although any number of the nonterminating networks can be connected in series and finally terminated to provide pulse widths in direct relationship to the number of sections. Connected to the output of the network combination is a load 14 which for radar applications might well be a magnetron or klystron tube.

Looking now at network section A it is seen that it is made up of series connected inductors having a plurality of taps 16 along its length. Each tap 16 is connected by a capacitor 18 to the common line 21. The taps subdivide the inductance into a multiplicity of central units 30 of substantially equal impedance, an initial unit 58 of higher inductance, and a final unit 20 of lower inductance. Inductor unit 58 has 20% to 30% greater inductance than that of a central unit 30. The network portion A is connected to network portion B by means of terminals 31, 32, 33 and 34.

Network portion B differs from that of A only in having the final inductor unit 20 ahead of the final capacitor 18'.

Fig. 2 shows a semi-universal network section C which can be a terminating network portion of a pulse forming network or initial or intermediate portions of such a network, depending upon the setting of switch 26 connected to the terminal capacitor. The network C is otherwise identical with those shown at A or B in Fig. 1, and corresponding parts are identified by the same reference characters. Switch 26 has a blade or movable contact 27 that can be arranged to engage either of two fixed contacts 28, 29. Contact 28 is connected to a tap between terminal inductor 20 and the adjacent intermediate inductor 30, while contact 29 is at the terminal of the inductor. It is seen that Fig. 2 portrays a 4-terminal network having terminals 41, 42, 43 and 44. When network C is to be used as the beginning or intermediate section of a multi-section network the switch 26 is placed so that the arm 27 contacts terminal 28. This means that the inductance unit 20 becomes connected beyond the terminal capacitor 18' and provides for the added mutual inductance referred to above. The magnitude of the inductance of unit 20 is from 0.6 to 0.9 that of inductor section 30. If the network C is to be used as a terminating section, the switch 26 has its blade 27 connected to pole 29 placing the final capacitor 18' at the end of the inductance thus providing for the improved pulse form as explained above.

Fig. 3 illustrates a miniaturized pulse forming network of the E type which yields extremely long pulse widths per unit volume. This modification incorporates the mutual inductance addition between network units and the individual elements correspond to the similarly numbered elements included in Figs. 1 and 2. The inductor assembly is made in two sections as indicated at 36 and 37 of the type indicated as A and B in Fig. 1, and connected by lead 40. Although only two individual sections are shown, greater numbers can be used if the teachings of this invention are incorporated. The terminals of the network of Fig. 3 are indicated at 51, 52. The folded assembly of Fig. 3 can be converted into a universal construction similar to that of Fig. 2 by incorporating a switch in the circuit of the final capacitor 18' of the assembly connected as indicated in Fig. 2.

For purposes of illustration of this invention a folded pulse network of the type described in Fig. 3 was constructed. The network was 24 mesh with each inductor mesh having its respective capacitor. The coils were bank wound upon a one-half inch diameter phenol-formaldehyde resin core with a 1/4" spacing between adjacent meshes. The network was thus wound on two cores—core A (section 36) having thirteen inductors including the input coil, and core B (section 37) having twelve inductors. The inductors were all bank wound with vitreous enamel coated #18 copper wire and of 2 layer construction with the following turns:

*Core A*

| | |
|---|---|
| Input coil | 27 turns=$L_{58}$ $(L_{38}+L_{20})$.[1] |
| Coils 2 through 11 | 21 turns=$L_{30}$.[1] |
| Coil 12 turnabout coil | 13 turns=$L_{20}$.[1] |

*Core B*

| | |
|---|---|
| Coil 13 turnabout coil | 13 turns=$L_{20}$.[1] |
| Coils 14 through 23 | 21 turns=$L_{30}$.[1] |
| Coil 24 ending | 27 turns=$L_{58}$[1] $(L_{38}+L_{20})$. |

[1] Refer to Fig. 3.

The capacitance per mesh was .0033 mfd. (for each mesh 2—.0066 mfd. aluminum foil mineral impregnated paper capacitors were series connected). The length of the conductor 40 of Fig. 3 should be kept to a minimum or else design the inductors to compensate for added inductance. This 24 mesh network had a total inductance of 120 microhenries or 4.27 microhenries per mesh of the $L_{30}$ type. The electrical characteristics of such a mesh are as follows:

*a.* 40 ohms measured impedance on a pulse bridge.
*b.* When charged to 11,500 volts and discharged through a 40 ohm load at 300 pulses per second had a pulse length of 5.98 microseconds, a rise time (10% to 80%) of 0.09 microsecond, and a distortion of less than 5%.
*c.* Output of 1590 volt-amperes when operated as in *b.*

As many apparently widely different embodiments of this invention may be made without departing from the spirit and scope hereof, it is to be understood that the invention is not limited to the specific embodiments hereof except as defined in the appended claims.

What is claimed is:

1. A pulse-forming network assembly for producing square energy pulses having a plurality of principal inductors with substantially equal inductances connected in series, an input connection including a larger inductance connected to one end of the series, capacitors connected from the juncture of each pair of inductances to a common conductor, a supplementing terminal inductor connected in series with the principal inductors at the other end of the series to supply inductance deficiency, an output connection at said other end, the terminal inductor having an inductance value between about 0.6 and 0.9 that of a principal inductor, an additional capacitor with two terminals, one connected to the common conductor and the second arranged for connection to one of the ends of the additional inductor whereby said network assembly is selectively connectable as one of the beginning, middle or terminating sections in a multiple section network.

2. A pulse-forming assembly for producing square energy pulses having a pulse-forming network with an input end and an output end, charging and discharging means connected to the input end, and load means connected to the output end, the network including a series-connected chain of inductors around a single form, the first inductor having more inductance than the intermediate inductors, the intermediate inductors having substantially equal inductance, and the last inductor having two series-connected inductance portions the input portion of which is substantially equal to the inductance of an intermediate inductor, the output portion of which has an inductance value between about 0.6 and 0.9 of the inductance of said intermediate inductors, a set of capacitors connected from the inductor chain to a common conductor, hte connections to the chain being at the output end of all but the last inductor, an additional capacitor, and a selecting mechanism connected for selectably connecting the additional capacitor between the common conductor and the output end of either portion of the last inductor so that the output portion of the last inductor supplies inductance deficiency when the additional capacitor is connected to the output end of the input portion of the last inductance.

References Cited in the file of this patent

UNITED STATES PATENTS

| | | |
|---|---|---|
| 2,461,321 | Guillemin | Feb. 8, 1949 |
| 2,608,654 | Street | Aug. 26, 1952 |